(12) United States Patent
Lin et al.

(10) Patent No.: US 8,525,659 B2
(45) Date of Patent: Sep. 3, 2013

(54) LED TAIL LAMP SYSTEM FOR VEHICLE USING PATTERN INDICATION

(75) Inventors: Hou-Yao Lin, Taipei Hsien (TW); Sheng-Jung Yu, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 466 days.

(21) Appl. No.: 12/903,224

(22) Filed: Oct. 13, 2010

(65) Prior Publication Data
US 2011/0156894 A1 Jun. 30, 2011

(30) Foreign Application Priority Data
Dec. 25, 2009 (TW) .............................. 98144908 A (51) Int. Cl.
*G08B 21/00* (2006.01)
(52) U.S. Cl.
USPC ........... 340/471; 340/468; 340/472; 340/475; 340/479; 362/459
(58) Field of Classification Search
USPC .................. 340/463–479; 362/459, 487–506
See application file for complete search history.

(56) References Cited

U.S. PATENT DOCUMENTS

| 4,868,719 A | 9/1989 | Kouchi et al. |
| 7,119,672 B2 * | 10/2006 | Subbaraman ................. 340/465 |
| 2004/0145463 A1 * | 7/2004 | Weatherspoon ............. 340/471 |
| 2005/0099287 A1 * | 5/2005 | Su ................................. 340/464 |
| 2005/0134447 A1 | 6/2005 | Su |

FOREIGN PATENT DOCUMENTS

| CN | 2213092 | 11/1995 |
| CN | 1743204 | 3/2006 |

* cited by examiner

Primary Examiner — Jeffery Hofsass
(74) Attorney, Agent, or Firm — Altis Law Group, Inc.

(57) ABSTRACT

A tail lamp system for a vehicle includes a dynamic signal unit, a control unit, a set of input lines electrically connecting the dynamic signal unit with the control unit, an LED display board, and a set of output lines electrically connecting the LED display board with the control unit. The dynamic signal unit provides a plurality of dynamic signals relating to various instant driving information of the vehicle. The control unit receives each of the dynamic signals of the dynamic signal unit and outputs a corresponding control signal. The LED display board receives the control signal from the control unit and displays a corresponding pattern according to the received control signal to indicate instant driving information of the vehicle, for example, turning, braking, temporary stop and breakdown of the vehicle.

8 Claims, 13 Drawing Sheets

LED TAIL LAMP SYSTEM FOR VEHICLE USING PATTERN INDICATION

BACKGROUND

1. Technical Field

The disclosure generally relates to tail lamp systems for vehicles; and more particularly to a tail lamp system capable of indicating instant driving information of the vehicle.

2. Description of Related Art

Tail lamps are commonly mounted at a caudal portion of a vehicle to provide an adequate warning to a following driver at the initiation of a vehicle operation so that the following driver can take an appropriate evasive action. Generally, the tail lamps of a vehicle include two turn lamps, i.e., left turn lamp and right turn lamp, mounted at two opposite sides of a caudal portion of the vehicle, and at least one brake lamp mounted at the caudal portion of the vehicle. A driver of the vehicle operates a switch to make the left/right turn lamp to flicker, thereby indicating that the vehicle is going to turn. When the driver makes a brake, the brake lamp is lighting to warn a following driver. The turn lamps and the brake lamp are separately mounted on the caudal portion of the vehicle. The components of the tail lamp system of the vehicle are too many and a structure of the tail lamp system is complex.

What is needed, therefore, is a tail lamp system can overcome the described limitations.

BRIEF DESCRIPTION OF THE DRAWINGS

Many aspects of the present embodiments can be better understood with reference to the following drawings. The components in the drawings are not necessarily drawn to scale, the emphasis instead placed upon clearly illustrating the principles of the present embodiments. Moreover, in the drawings, like reference numerals designate corresponding parts throughout the several views.

DETAILED DESCRIPTION

Figure 1:
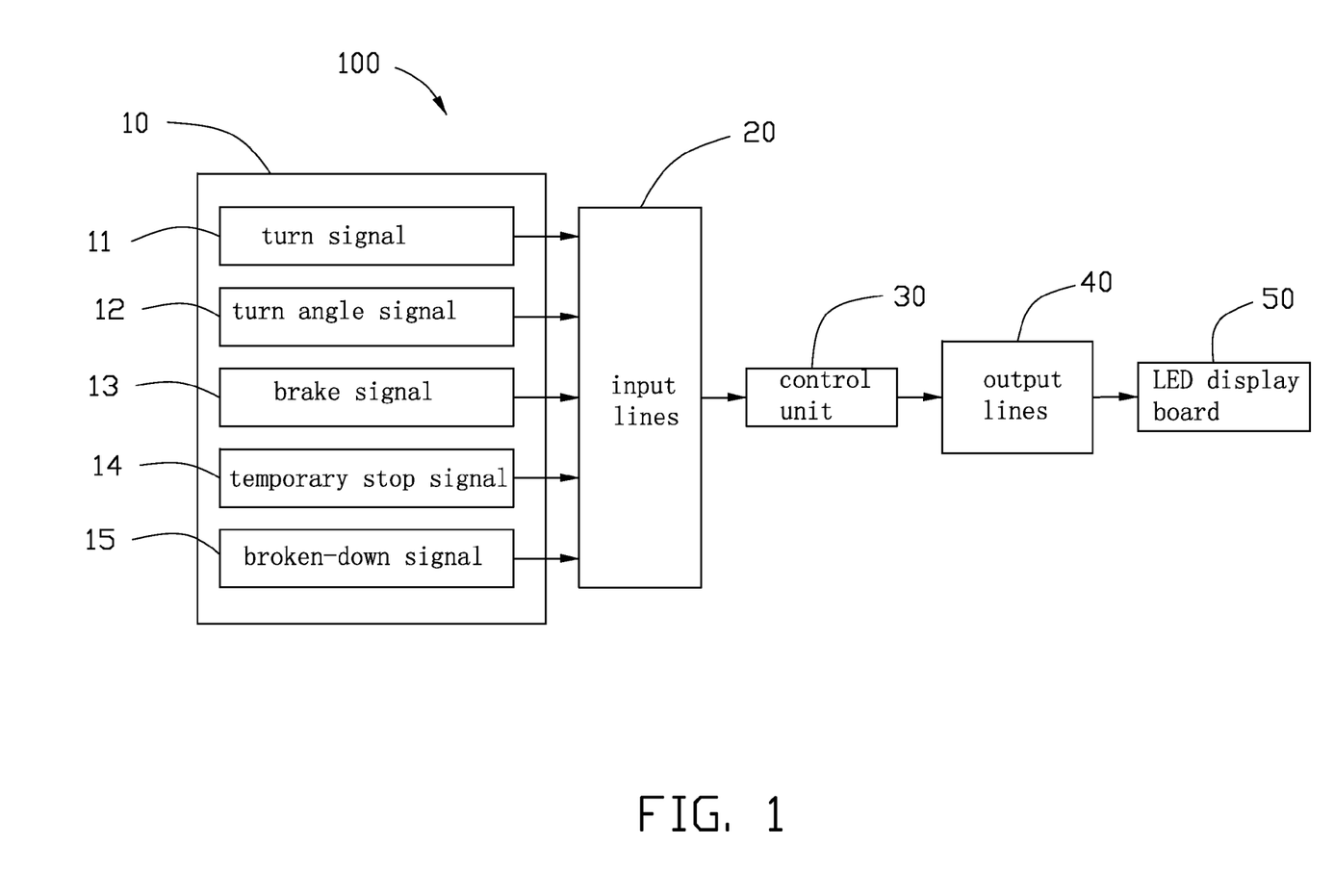
FIG. 1 is a block diagram of a tail lamp system for vehicles in accordance with an exemplary embodiment of the present disclosure.

Referring to FIG. 1, a tail lamp system 100 for vehicles according to an exemplary embodiment of the present disclosure is shown. The tail lamp system 100 is mounted on a vehicle (not shown) to indicate instant driving information of the vehicle. The tail lamp system 100 includes a dynamic signal unit 10, a set of input lines 20, a control unit 30, a set of output lines 40, and an LED display board 50 arranged at a caudal portion of the vehicle.

The dynamic signal unit 10 provides a plurality of dynamic signals relating to various instant driving information of the vehicle. In this embodiment, the dynamic signal unit 10 includes a turn signal 11, a turn angle signal 12, a brake signal 13, a temporary stop signal 14, and a broken-down signal 15. The turn signal 11 is provided by a turn switch of the vehicle. The turn angle signal 12 is provided by a turn angle sensor of the vehicle for detecting a turn direction and a turn angle of a steering wheel of the vehicle. The brake signal 13 is provided by a force sensor of the vehicle for detecting an operating (pressing) force acting on a brake of the vehicle. The temporary stop signal 14 is provided by a temporary stop switch of the vehicle. The broken-down signal 15 is provided by an emergency switch of the vehicle.

The set of input lines 20 electrically connects the dynamic signals (i.e., the turn signal 11, the turn angle signal 12, the brake signal 13, the temporary stop signal 14, and the broken-down signal 15) of the dynamic signal unit 10 with the control unit 30 for transmitting the dynamic signals to the control unit 30. The control unit 30 can be a microprocessor. The control unit 30 receives the dynamic signals of the dynamic signal unit 10, and then converts each of the dynamic signals to a corresponding control signal which is sent to the LED display board 50 via the set of output lines 40.

Figure 2:
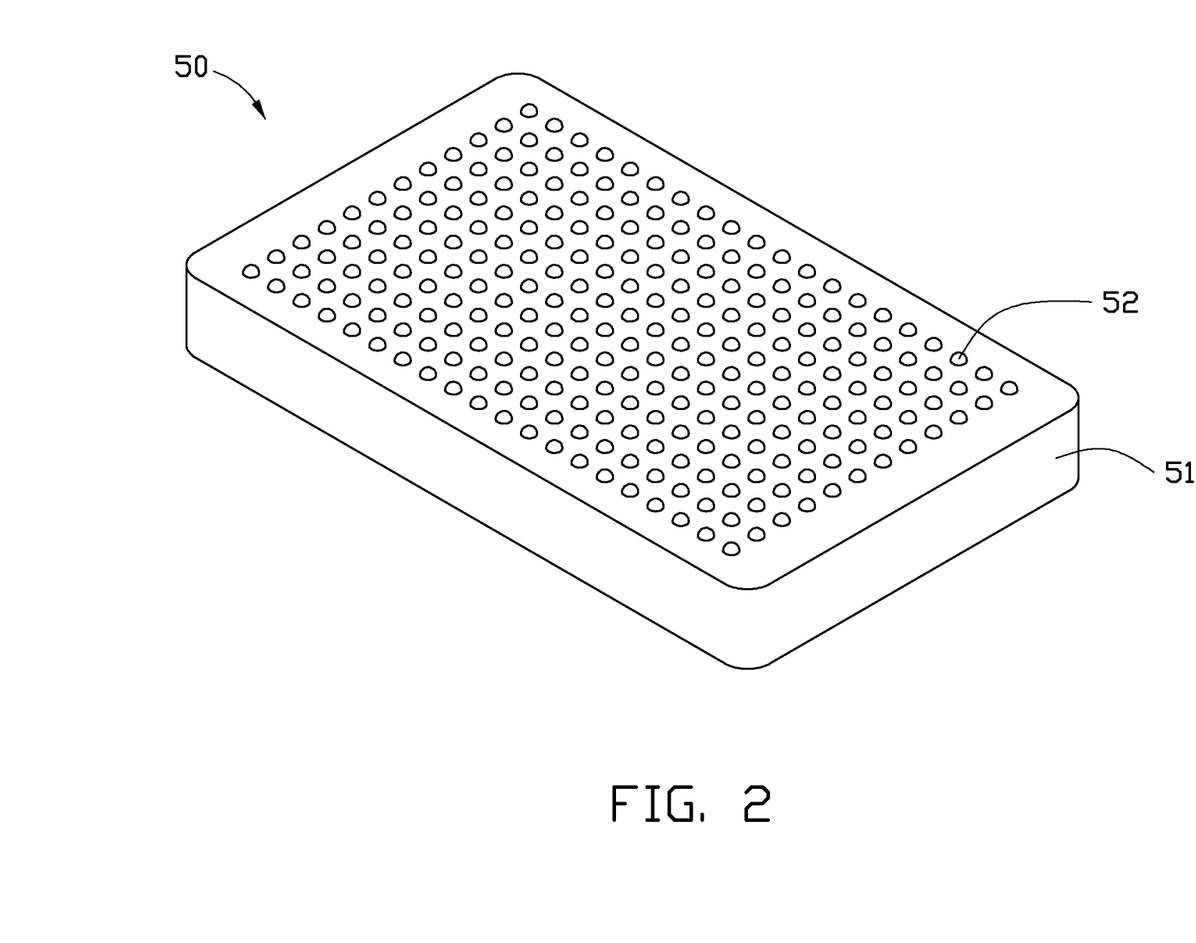
FIG. 2 is a schematic, isometric view of a light emitting diode (LED) display board of the tail lamp system of FIG. 1.

Referring to FIG. 2, the LED display board 50 includes a rectangular base 51 and a plurality of LEDs 52 mounted on the base 51. A control chip is arranged in the base 51 and electrically connects with the LEDs 52. When the control chip of the LED display board 50 receives the control signal from the control unit 30, a particular region of the LEDs 52 are turned on by controlling of the control chip to display a corresponding pattern. Thus, the LED display board 50 can display various patterns by inputting different control signals to the LED display board 50.

Figure 3:
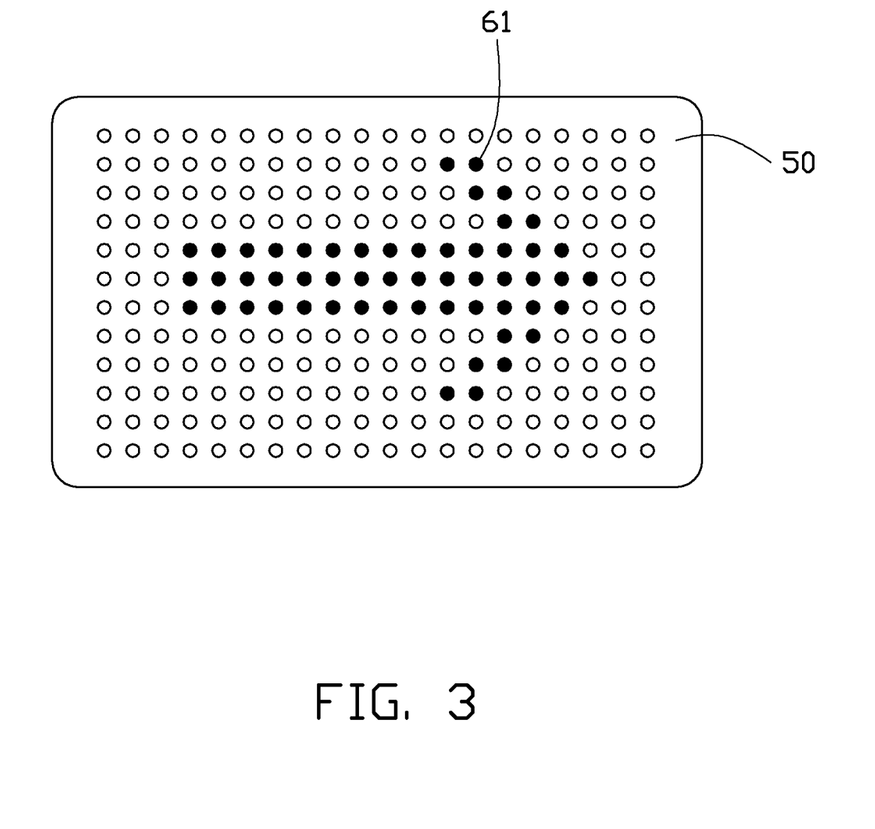
FIG. 3 is a schematic view illustrating a pattern displayed by the LED display board of FIG. 2 to indicate that the vehicle will make a right turn.
Figure 4:
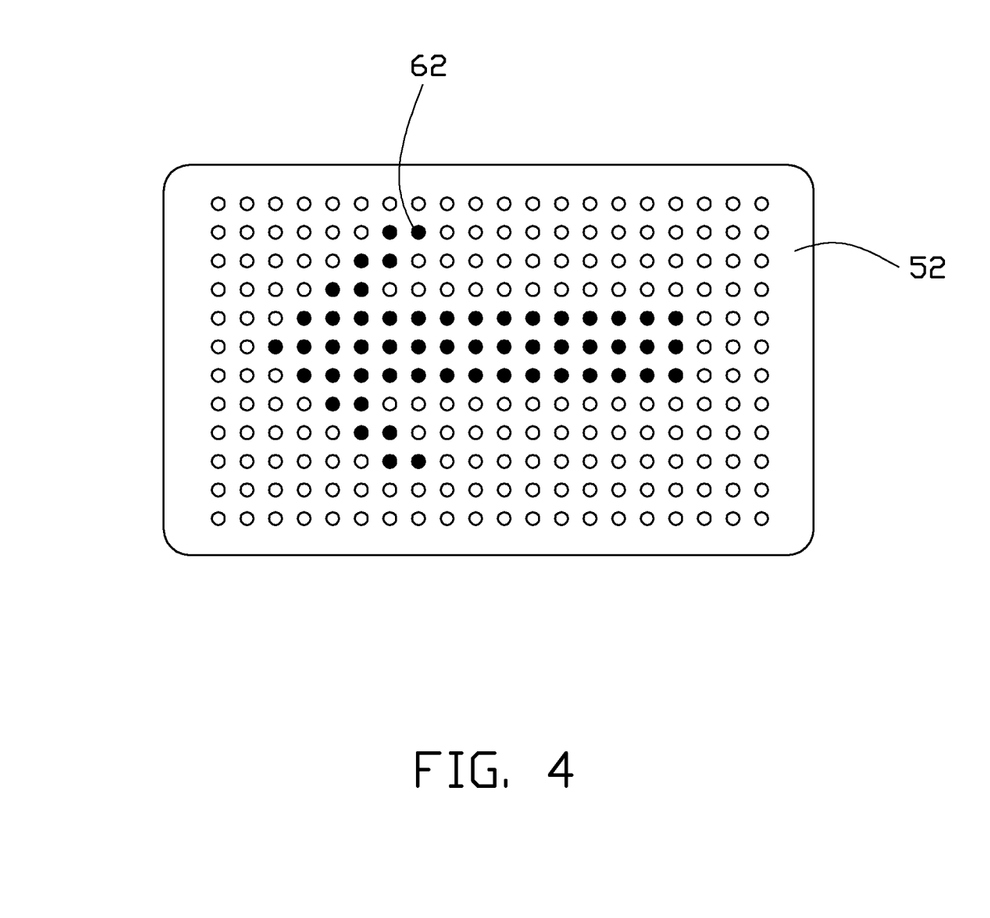
FIG. 4 is a schematic view illustrating a pattern displayed by the LED display board of FIG. 2 to indicate that the vehicle will make a left turn.

When a driver of the vehicle wants to make a turn, the driver operates the turn switch of the vehicle to provide the turn signal 11. The turn signal 11 is transmitted to the control unit 30 via the set of input lines 20. The control unit 30 converts the turn signal 11 to output a first control signal. The first control signal is transmitted to the LED display board 50 via the set of output lines 40. According to the first control signal from the control unit 30, the LED display board 50 displays a corresponding pattern to indicate that the vehicle is going to make a turn. Referring to FIG. 3, while the turn signal 11 relates to an intended right turn operation, the LED display board 50 displays a pattern having an arrow symbol 61 pointing to right to indicate that the vehicle is going to make a right turn. Referring to FIG. 4, while the turn signal 11 relates to an intended left turn operation, the LED display board 50 displays a pattern having an arrow symbol 62 pointing to left to indicate that the vehicle is going to make a left turn.

Figure 5:
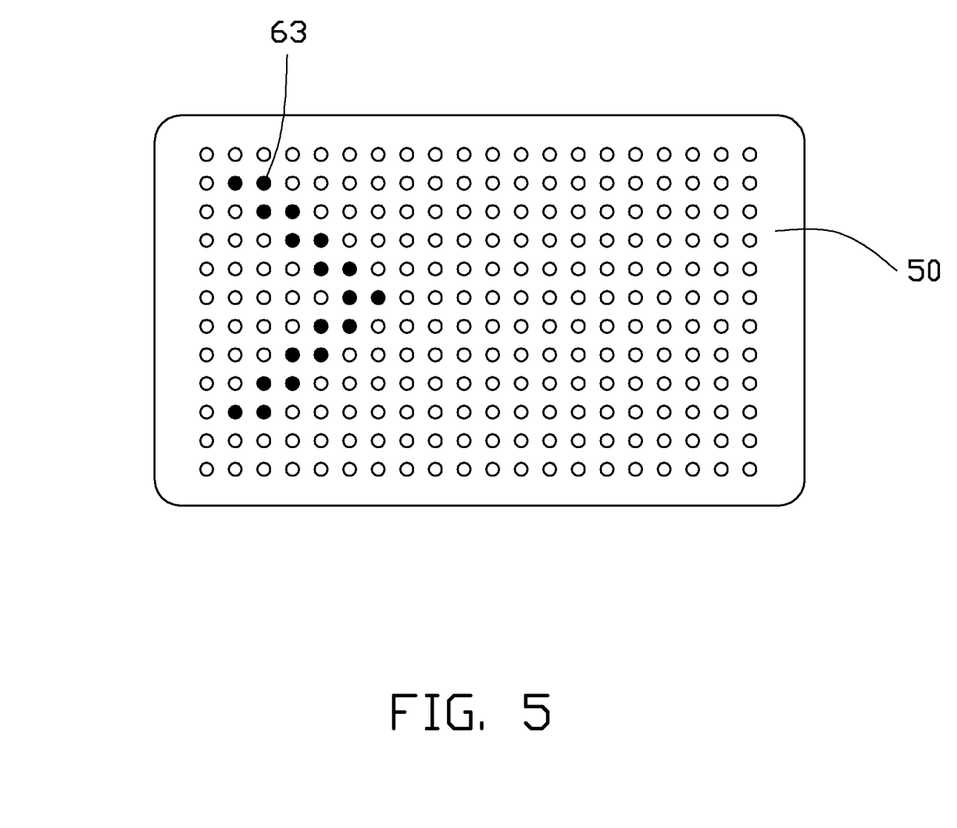
FIGS. 5-7 are schematic views illustrating a pattern displayed by the LED display board of FIG. 2 to indicate that the vehicle is in a right turn state, wherein a turn angle of the vehicle is successively increased from FIG. 5 to FIG. 7.
Figure 6:
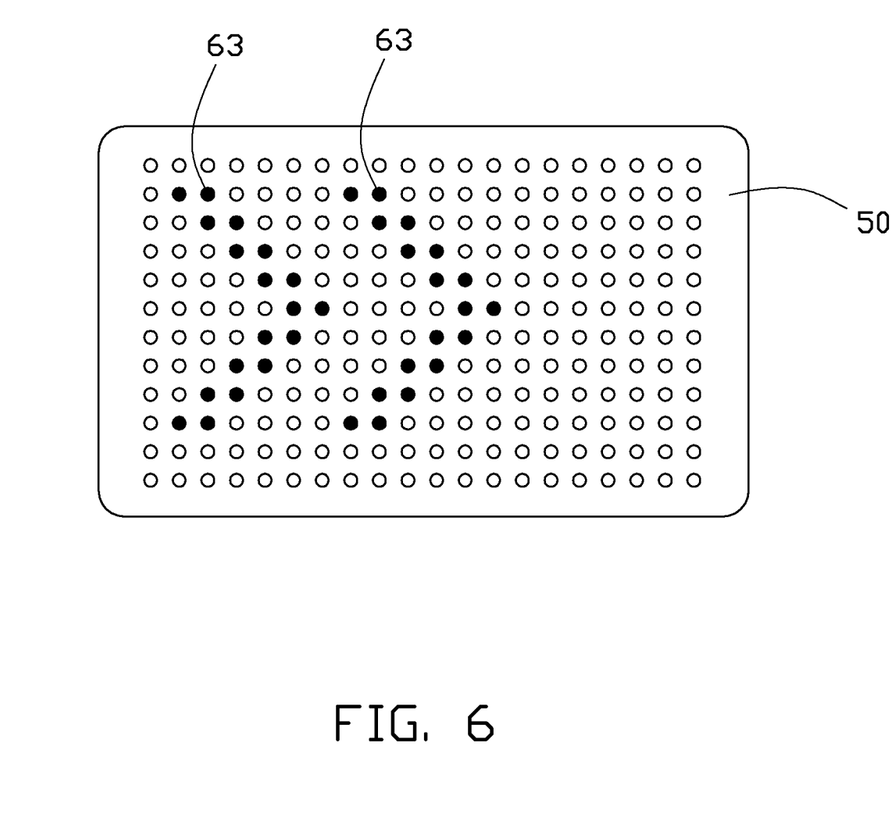
Figure 7:
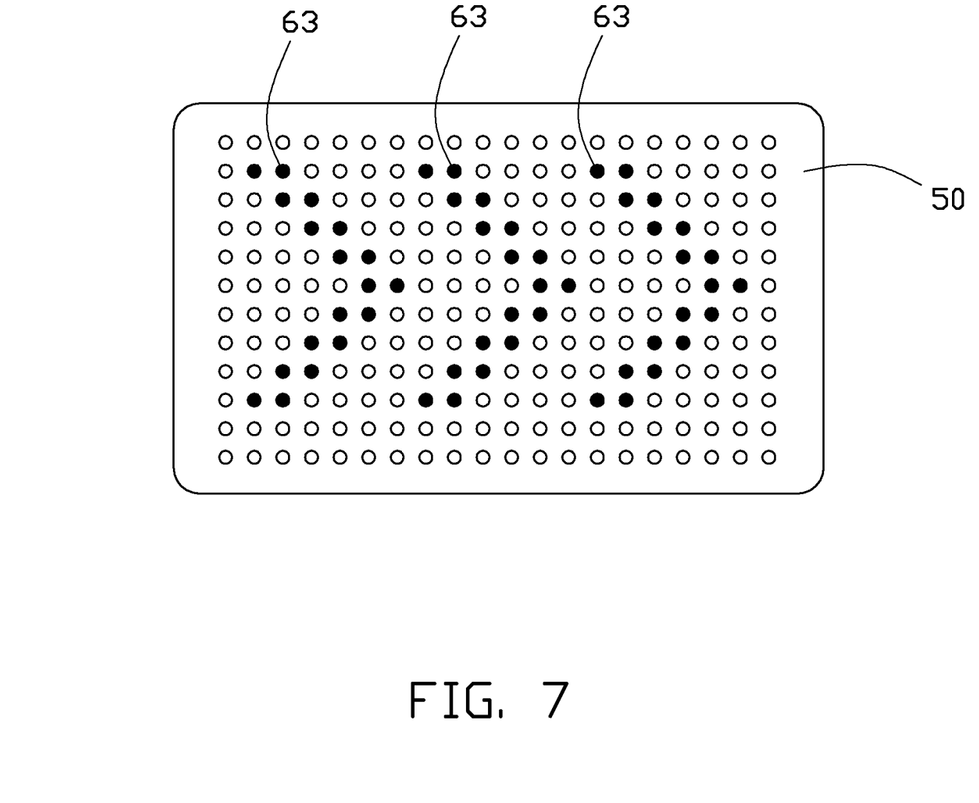

Once the driver operates the steering wheel of the vehicle to make a turn, the turn angle sensor detects the turn direction and turn angle of the steering wheel of the vehicle to provide the turn angle signal 12. The turn angle signal 12 is transmitted to the control unit 30 via the set of input lines 20. The control unit 30 converts the turn angle signal 12 to output a second control signal. The second control signal is transmitted to the LED display board 50 via the set of output lines 40. According to the second control signal from the control unit 30, the LED display board 50 displays a corresponding pattern to indicate the turn direction and turn angle of the steering wheel. Referring to FIGS. 5-7, while the turn angle signal 12 relates to a right turn operation, the LED display board 50 displays a pattern having at least one right arrow symbol 63 to indicate the turn direction and turn angle of the steering wheel. Particularly, the more the right arrow symbols 63 of the pattern are displayed, the larger the turn angle of the steering wheel is. In contrast, while the turn angle signal 12 relates to a left turn operation, the LED display board 50 displays a pattern having at least one left arrow symbol to indicate the turn direction and turn angle of the steering wheel.

Figure 8:
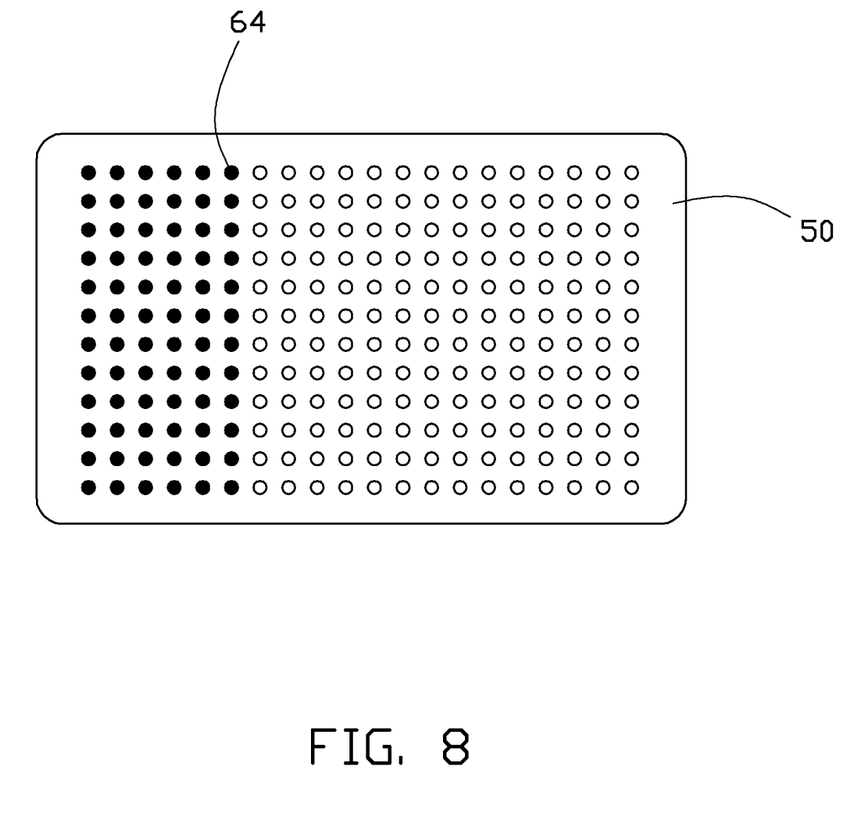
FIGS. 8-10 are schematic views illustrating a pattern displayed by the LED display board of FIG. 2 to indicate that the vehicle is in a braking state, wherein a braking force applied to the vehicle is successively increased from FIG. 8 to FIG. 10.
Figure 9:
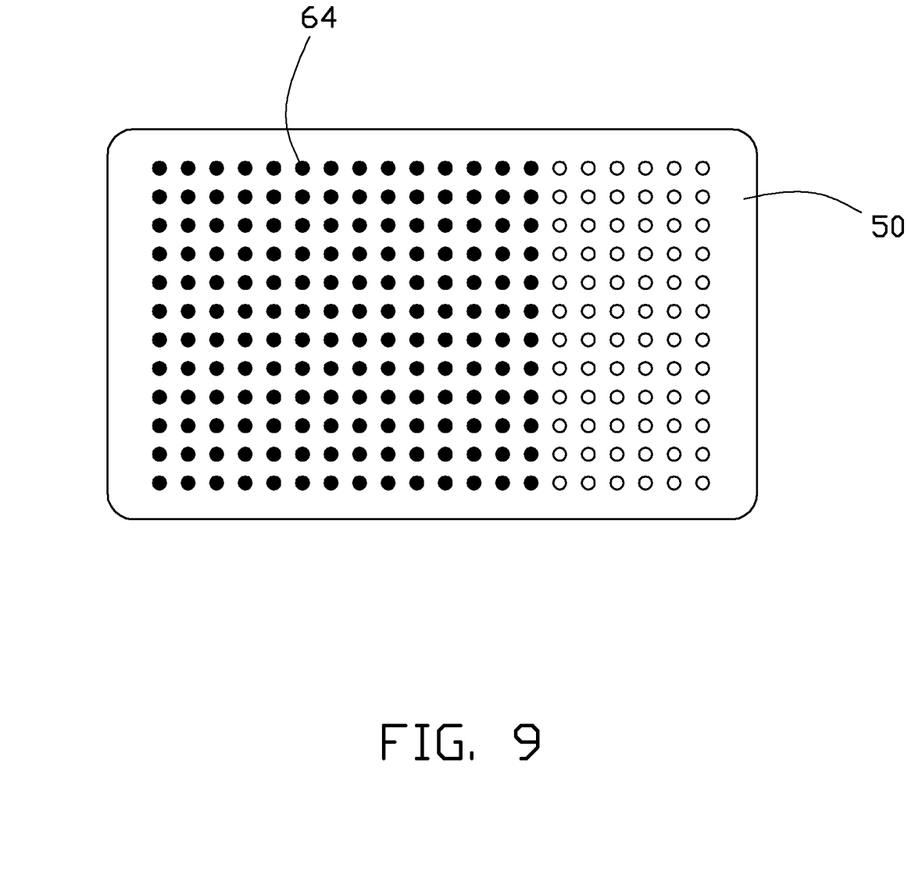
Figure 10:
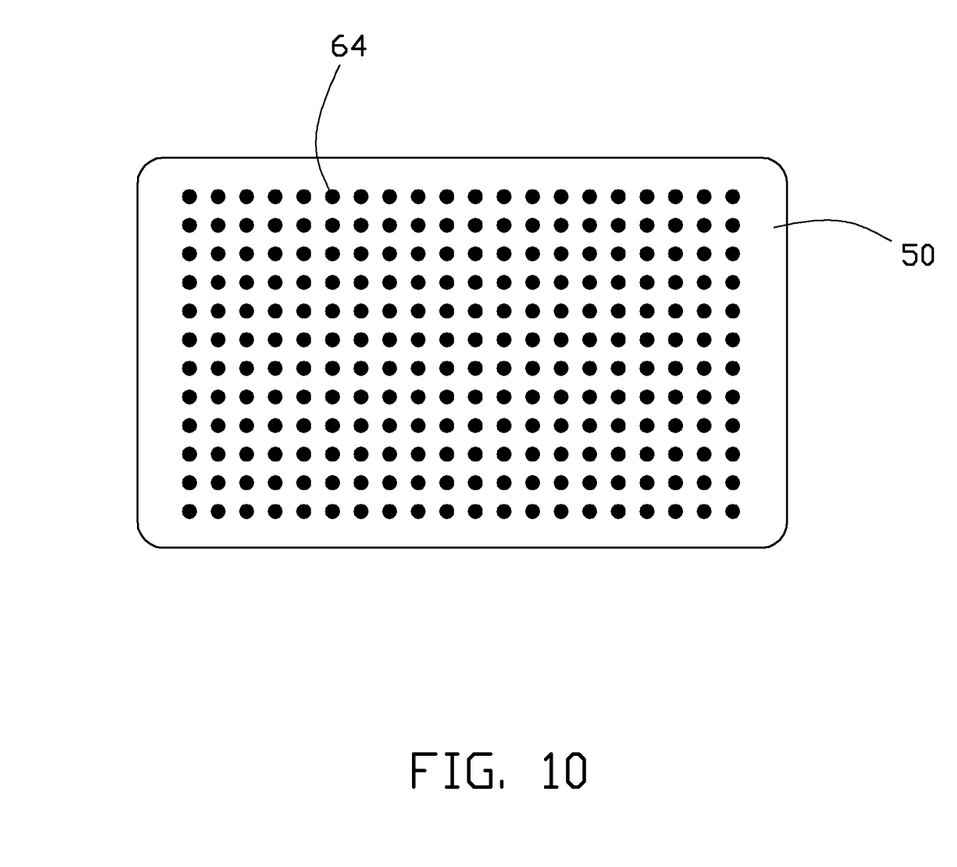

When the force sensor detects an operating force acting on the brake of the vehicle, the force sensor provides the brake signal 13 corresponding to the operating force. The brake signal 13 is transmitted to the control unit 30 via the set of input lines 20. The control unit 30 converts the brake signal 13 to output a third control signal. The third control signal is transmitted to the LED display board 50 via the set of output lines 40. According to the third control signal from the control unit 30, the LED display board 50 displays a corresponding pattern to indicate a strength of the operating force acting on the brake. Referring to FIGS. 8-10, when the operating force is acted on the brake, the LED display board 50 displays a pattern having a rectangular symbol 64 to indicate the strength of the operating force acting on the brake. Particularly, the larger an area of the rectangle symbol 64 of the pattern is displayed, the stronger the operating force acting on the brake is provided.

Figure 11:
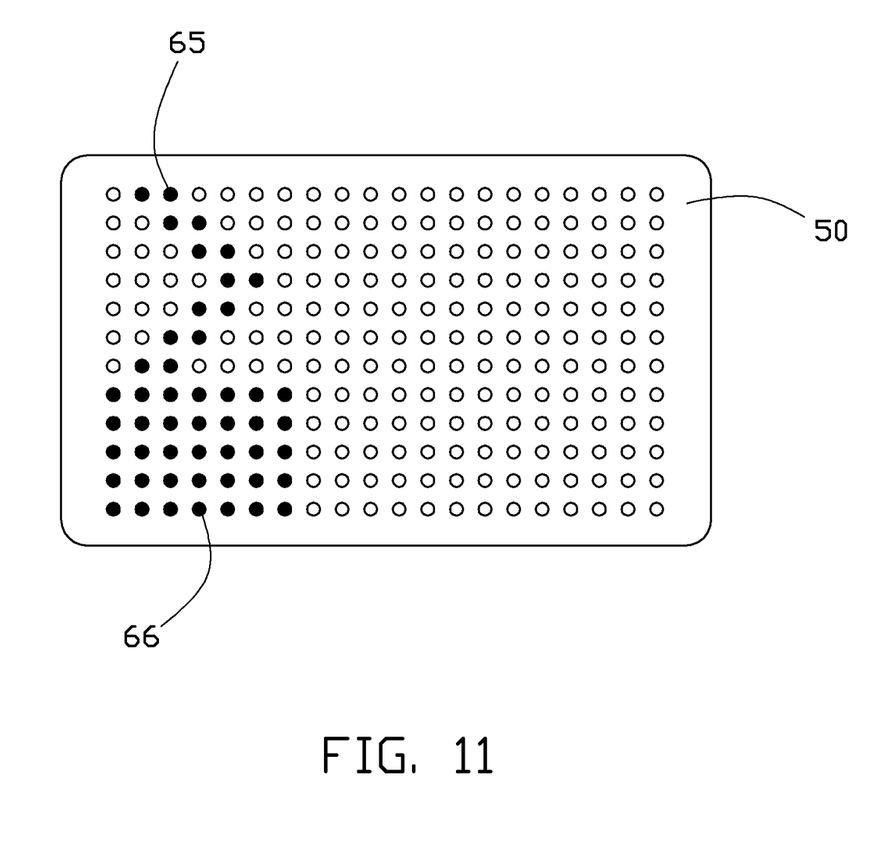
FIG. 11 is a schematic view illustrating a pattern displayed by the LED display board of FIG. 2 to indicate that the vehicle is in both a right turn state and a braking state.

When the driver operates the steering wheel of the vehicle to make a turn and simultaneously operates the brake to slow the vehicle, the turn angle signal 12 from the turn angle sensor and the brake signal 13 from the force sensor are simultaneously transmitted to the control unit 30 via the set of input lines 20. The control unit 30 converts the turn angle signal 12 and the brake signal 13 to output a fourth control signal. The fourth control signal is transmitted to the LED display board 50 via the set of output lines 40. According to the fourth control signal from the control unit 30, the LED display board 50 displays a corresponding pattern having two types of symbols in upper and lower portions of the display board 50 (i.e., a first type of symbol in upper portion and a second type of symbol in lower portion), to respectively indicate the turn direction and turn angle of the steering wheel and the strength of the operating force acting on the brake. Referring to FIG. 11, the pattern displayed by the LED display board 50 has at least one right arrow symbol 65 in a top row to indicate the turn direction (turn right) and turn angle of the steering wheel, and a rectangle symbol 66 in a bottom row to indicate the strength of the operating force acting on the brake. Similar to FIGS. 5-7, the more the right arrow symbols 65 of the pattern are displayed, the larger the turn angle of the steering wheel is. Similar to FIGS. 8-10, the larger an area of the rectangle symbol 66 of the pattern is displayed, the stronger the operating force acting on the brake is provided.

Figure 12:
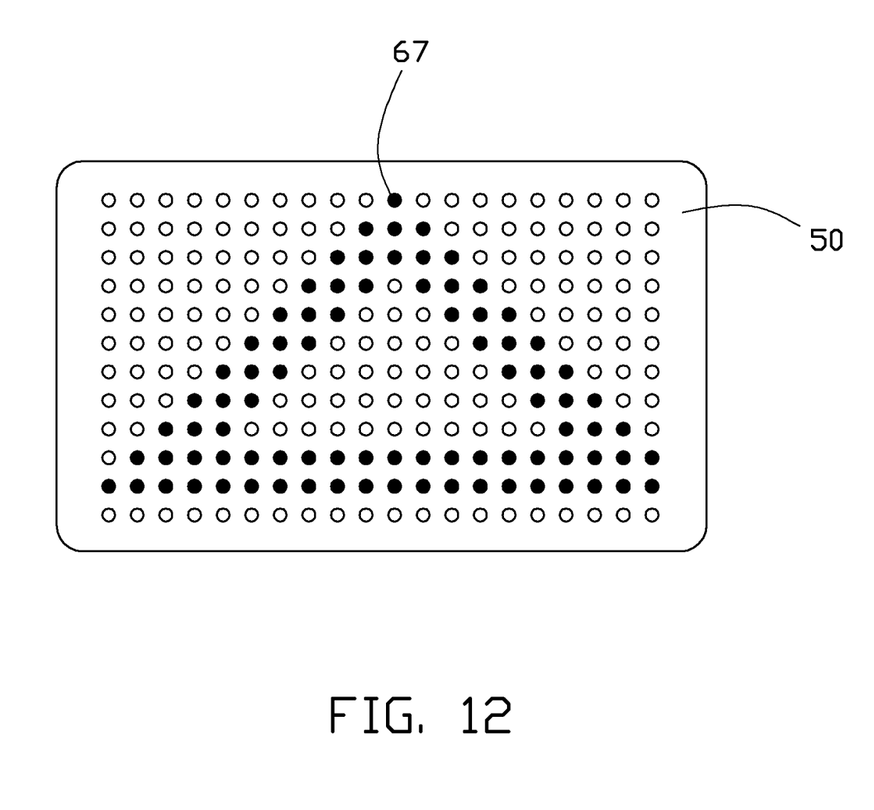
FIG. 12 is a schematic view illustrating a pattern displayed by the LED display board of FIG. 2 to indicate that the vehicle is in a temporary stop state.

When the driver of the vehicle wants to stop the vehicle temporarily, the driver operates the temporary stop switch of the vehicle to provide the temporary stop signal 14. The temporary stop signal 14 is transmitted to the control unit 30 via the set of input lines 20. The control unit 30 converts the temporary stop signal 14 to output a fifth control signal. The fifth control signal is transmitted to the LED display board 50 via the set of output lines 40. According to the fifth control signal from the control unit 30, the LED display board 50 displays a corresponding pattern to indicate a temporary stop. Referring to FIG. 12, while the vehicle is stopped temporarily, the LED display board 50 displays a pattern having a triangle symbol 67 to indicate that the vehicle is stopped temporarily.

Figure 13:
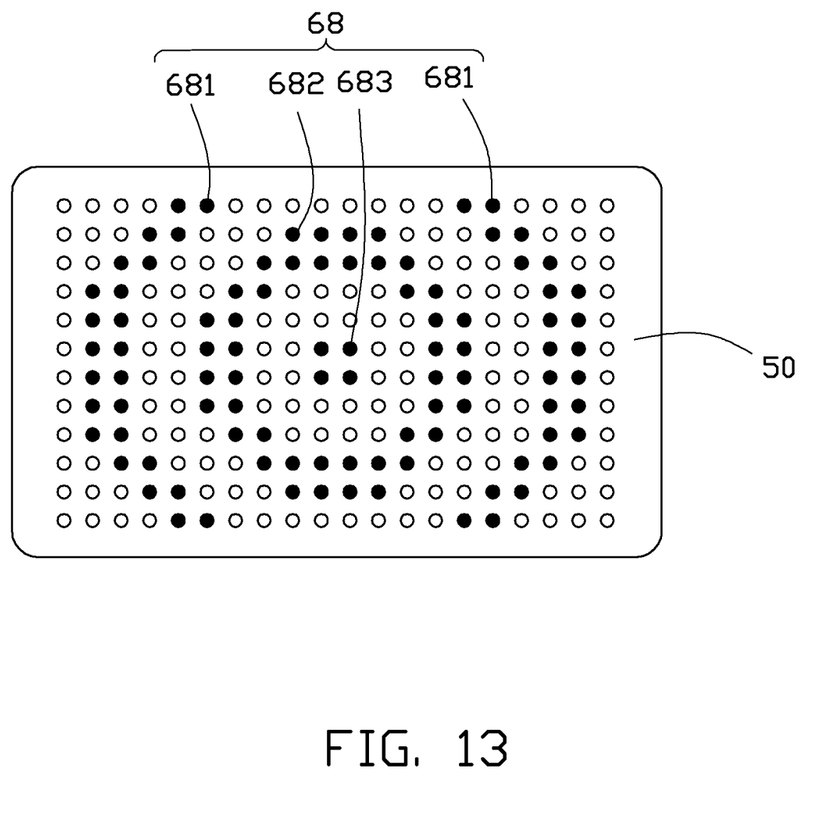
FIG. 13 is a schematic view illustrating a pattern displayed by the LED display board of FIG. 2 to indicate that the vehicle is in a broken-down state.

When the vehicle is broken-down, the driver operates the emergency switch to provide the broken-down signal 15. The broken-down signal 15 is transmitted to the control unit 30 via the set of input lines 20. The control unit 30 converts the broken-down signal 15 to output a sixth control signal. The sixth control signal is transmitted to the LED display board 50 via the set of output lines 40. According to the sixth control signal from the control unit 30, the LED display board 50 displays a corresponding pattern to indicate that the vehicle is in a broken-down state. Referring to FIG. 13, while the vehicle is broken-down, the LED display board 50 displays a pattern having a pair of parentheses 681, a circle 682 located between the pair of parentheses 681, and a dot 683 located at a center of the circle 682, thereby indicating that the vehicle is broken-down.

In the tail lamp system 100, according to the dynamic symbol provided by the dynamic signal unit 10, the LED display board 50 can display a corresponding pattern to indicate instant driving information of the vehicle, thereby providing an adequate warning to a following driver at the initiation of a vehicle operation so that the following driver can take an appropriate evasive action. The tail lamp system 100 uses the single LED display board 50 to display various traveling information of the vehicle, simplifying the structure of the tail lamp system 100.

It is to be understood, however, that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A tail lamp system for a vehicle, the tail lamp system comprising:
    a dynamic signal unit providing a plurality of dynamic signals relating to various instant driving information of the vehicle, the instant driving information including turning of the vehicle, braking of the vehicle, temporary stop of the vehicle and breakdown of the vehicle;
    a set of input lines;
    a control unit electrically connected to the dynamic signal unit via the set of input lines, the control unit receiving each of the dynamic signals of the dynamic signal unit and outputting a corresponding control signal;
    a set of output lines; and
    an LED display board electrically connected to the control unit via the set of output lines, the LED display board receiving the corresponding control signal from the control unit and displaying a corresponding pattern according to the received corresponding control signal to indicate the instant driving information of the vehicle,
    wherein the dynamic signals comprise a turn signal, a turn angle signal and a brake signal, when the control unit simultaneously receives the turn angle signal and the brake signal, the pattern displayed by the LED display board has a first type of symbol in a first row to indicate the turn direction and turn angle of a steering wheel, and a second type of symbol in a second row to indicate the strength of the operating force acting on a brake, the first type of symbol of the pattern comprises at least one right/left directional symbol, and the second type of symbol is a rectangle symbol, the directional symbol is V-shaped.

2. The tail lamp system of claim 1, wherein the LED display board comprises a base and a plurality of LEDs mounted on the base.

3. The tail lamp system of claim 1, wherein the turn signal is provided by a turn switch of the vehicle, the turn angle signal is provided by a turn angle sensor of the vehicle for detecting a turn direction and a turn angle of the steering wheel of the vehicle, and the brake signal is provided by a force sensor of the vehicle for detecting an operating force acting on the brake of the vehicle.

4. The tail lamp system of claim 1, wherein when the control unit receives the turn angle signal, the pattern displayed by the LED display board has at least one right/left arrow symbol to indicate a turn direction and a turn angle of the steering wheel, the more the right/left arrow symbols of the pattern being displayed, the larger the turn angle of the steering wheel being.

5. The tail lamp system of claim 1, wherein when the control unit receives the brake signal, the pattern displayed by the LED display board has a rectangle symbol to indicate the strength of the operating force acting on the brake, the larger an area of the rectangle symbol of the pattern being displayed, the stronger the operating force acting on the brake being provided.

6. The tail lamp system of claim 1, wherein the dynamic signals further comprise a temporary stop signal and a broken-down signal.

7. The tail lamp system of claim 6, wherein the temporary stop signal is provided by a temporary stop switch of the vehicle, and the broken-down signal is provided by an emergency switch of the vehicle.

8. The tail lamp system of claim 1, wherein the control unit is a microprocessor.

* * * * *